(12) United States Patent
Raichelgauz et al.

(10) Patent No.: US 10,535,192 B2
(45) Date of Patent: Jan. 14, 2020

(54) SYSTEM AND METHOD FOR GENERATING A CUSTOMIZED AUGMENTED REALITY ENVIRONMENT TO A USER

(71) Applicant: Cortica, Ltd., Tel Aviv (IL)

(72) Inventors: Igal Raichelgauz, New York, NY (US); Karina Odinaev, New York, NY (US); Yehoshua Y Zeevi, Haifa (IL)

(73) Assignee: CORTICA LTD., Tel Aviv (IL)

(*) Notice: Subject to any disclaimer, the term of this patent is extended or adjusted under 35 U.S.C. 154(b) by 713 days.

(21) Appl. No.: 15/252,790

(22) Filed: Aug. 31, 2016

(65) Prior Publication Data
US 2016/0371890 A1 Dec. 22, 2016

Related U.S. Application Data

(63) Continuation-in-part of application No. 14/643,694, filed on Mar. 10, 2015, now Pat. No. 9,672,217.
(Continued)

(51) Int. Cl.
G06T 19/00 (2011.01)
G06F 16/43 (2019.01)
G06F 16/438 (2019.01)

(52) U.S. Cl.
CPC ............ *G06T 19/006* (2013.01); *G06F 16/43* (2019.01); *G06F 16/438* (2019.01)

(58) Field of Classification Search
None
See application file for complete search history.

(56) References Cited

U.S. PATENT DOCUMENTS 4,733,353 A 3/1988 Jaswa
4,932,645 A 6/1990 Schorey et al.
(Continued)

FOREIGN PATENT DOCUMENTS

WO 0231764 4/2002
WO 2003005242 A1 1/2003
(Continued)

OTHER PUBLICATIONS

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
(Continued)

*Primary Examiner* — Uyen T Le
(74) *Attorney, Agent, or Firm* — Reches Patents

(57) ABSTRACT

Systems and methods for generating a customized augmented reality environment. A method includes causing generation of at least one signature for at least one multimedia content; causing, based on the generated at least one signature, identification of at least one matching concept, wherein each concept is a collection of signatures and metadata representing the concept; determining, based on the identified at least one matching concept, a selection of at least one augmented reality character; and generating a customized augmented reality environment, wherein the customized augmented reality environment includes each augmented reality character superimposed on the at least one multimedia content element as an overlay.

28 Claims, 6 Drawing Sheets

Related U.S. Application Data which is a continuation of application No. 13/766,463, filed on Feb. 13, 2013, now Pat. No. 9,031,999, which is a continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009.

(60) Provisional application No. 62/372,372, filed on Aug. 9, 2016.

(56) References Cited

U.S. PATENT DOCUMENTS

| | | | |
|---|---|---|---|
| 4,972,363 | A | 11/1990 | Nguyen et al. |
| 5,307,451 | A | 4/1994 | Clark |
| 5,568,181 | A | 10/1996 | Greenwood et al. |
| 5,806,061 | A | 9/1998 | Chaudhuri et al. |
| 5,852,435 | A | 12/1998 | Vigneaux et al. |
| 5,870,754 | A | 2/1999 | Dimitrova et al. |
| 5,873,080 | A | 2/1999 | Coden et al. |
| 5,887,193 | A | 3/1999 | Takahashi et al. |
| 5,940,821 | A | 8/1999 | Wical |
| 5,978,754 | A | 11/1999 | Kumano |
| 5,987,454 | A | 11/1999 | Hobbs |
| 6,038,560 | A | 3/2000 | Wical |
| 6,052,481 | A | 4/2000 | Grajski et al. |
| 6,076,088 | A | 6/2000 | Paik et al. |
| 6,122,628 | A | 9/2000 | Castelli et al. |
| 6,137,911 | A | 10/2000 | Zhilyaev |
| 6,144,767 | A | 11/2000 | Bottou et al. |
| 6,147,636 | A | 11/2000 | Gershenson |
| 6,240,423 | B1 | 5/2001 | Hirata |
| 6,243,375 | B1 | 6/2001 | Speicher |
| 6,243,713 | B1 | 6/2001 | Nelson et al. |
| 6,329,986 | B1 | 12/2001 | Cheng |
| 6,363,373 | B1 | 3/2002 | Steinkraus |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,493,692 | B1 | 12/2002 | Kobayashi et al. |
| 6,493,705 | B1 | 12/2002 | Kobayashi et al. |
| 6,523,022 | B1 | 2/2003 | Hobbs |
| 6,523,046 | B2 | 2/2003 | Liu et al. |
| 6,524,861 | B1 | 2/2003 | Anderson |
| 6,526,400 | B1 | 2/2003 | Takata et al. |
| 6,550,018 | B1 | 4/2003 | Abonamah et al. |
| 6,560,597 | B1 | 5/2003 | Dhillon et al. |
| 6,594,699 | B1 | 7/2003 | Sahai et al. |
| 6,601,060 | B1 | 7/2003 | Tomaru |
| 6,611,628 | B1 | 8/2003 | Sekiguchi et al. |
| 6,611,837 | B2 | 8/2003 | Schreiber |
| 6,618,711 | B1 | 9/2003 | Ananth |
| 6,643,620 | B1 | 11/2003 | Contolini et al. |
| 6,643,643 | B1 | 11/2003 | Lee et al. |
| 6,675,159 | B1 | 1/2004 | Lin et al. |
| 6,704,725 | B1 | 3/2004 | Lee |
| 6,728,706 | B2 | 4/2004 | Aggarwal et al. |
| 6,732,149 | B1 | 5/2004 | Kephart |
| 6,751,363 | B1 | 6/2004 | Natsev et al. |
| 6,754,435 | B2 | 6/2004 | Kim |
| 6,763,069 | B1 | 7/2004 | Divakaran et al. |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 | 10/2004 | Krishnamachari |
| 6,819,797 | B1 | 11/2004 | Smith et al. |
| 6,836,776 | B2 | 12/2004 | Schreiber |
| 6,845,374 | B1 | 1/2005 | Oliver et al. |
| 6,901,207 | B1 | 5/2005 | Watkins |
| 6,938,025 | B1 | 8/2005 | Lulich et al. |
| 6,970,881 | B1 | 11/2005 | Mohan et al. |
| 6,978,264 | B2 | 12/2005 | Chandrasekar et al. |
| 7,006,689 | B2 | 2/2006 | Kasutani |
| 7,013,051 | B2 | 3/2006 | Sekiguchi et al. |
| 7,043,473 | B1 | 5/2006 | Rassool et al. |
| 7,124,149 | B2 | 10/2006 | Smith et al. |
| 7,199,798 | B1 | 4/2007 | Echigo et al. |
| 7,215,828 | B2 | 5/2007 | Luo |
| 7,260,564 | B1 | 8/2007 | Lynn et al. |
| 7,277,928 | B2 | 10/2007 | Lennon |
| 7,296,012 | B2 | 11/2007 | Ohashi |
| 7,302,117 | B2 | 11/2007 | Sekiguchi et al. |
| 7,313,805 | B1 | 12/2007 | Rosin et al. |
| 7,346,629 | B2 | 3/2008 | Kapur et al. |
| 7,392,238 | B1 | 6/2008 | Zhou et al. |
| 7,406,459 | B2 | 7/2008 | Chen et al. |
| 7,450,740 | B2 | 11/2008 | Shah et al. |
| 7,523,102 | B2 | 4/2009 | Bjarnestam et al. |
| 7,526,607 | B1 | 4/2009 | Singh et al. |
| 7,536,384 | B2 | 5/2009 | Venkataraman et al. |
| 7,542,969 | B1 | 6/2009 | Rappaport et al. |
| 7,548,910 | B1 | 6/2009 | Chu et al. |
| 7,555,477 | B2 | 6/2009 | Bayley et al. |
| 7,555,478 | B2 | 6/2009 | Bayley et al. |
| 7,562,076 | B2 | 7/2009 | Kapur |
| 7,574,436 | B2 | 8/2009 | Kapur et al. |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,694,318 | B2 | 4/2010 | Eldering et al. |
| 7,836,054 | B2 | 11/2010 | Kawai et al. |
| 7,920,894 | B2 | 4/2011 | Wyler |
| 7,921,107 | B2 | 4/2011 | Chang et al. |
| 7,974,994 | B2 | 7/2011 | Li et al. |
| 7,987,194 | B1 | 7/2011 | Walker et al. |
| 7,987,217 | B2 | 7/2011 | Long et al. |
| 7,991,715 | B2 | 8/2011 | Schiff et al. |
| 8,000,655 | B2 | 8/2011 | Wang et al. |
| 8,036,893 | B2 | 10/2011 | Reich |
| 8,098,934 | B2 | 1/2012 | Vincent et al. |
| 8,112,376 | B2 | 2/2012 | Raichelgauz et al. |
| 8,266,185 | B2 | 9/2012 | Raichelgauz et al. |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 | 12/2012 | Raichelgauz et al. |
| 8,345,982 | B2 | 1/2013 | Gokturk et al. |
| 8,548,828 | B1 | 10/2013 | Longmire |
| 8,655,801 | B2 | 2/2014 | Raichelgauz et al. |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |

(56) References Cited

U.S. PATENT DOCUMENTS

| | | |
|---|---|---|
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,438,270 B2 | 9/2016 | Raichelgauz et al. |
| 9,875,445 B2 * | 1/2018 | Amer .................. G06N 7/005 |
| 9,901,828 B2 * | 2/2018 | Miller .................. G06T 19/006 |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0019881 A1 | 2/2002 | Bokhari et al. |
| 2002/0038299 A1 | 3/2002 | Zernik et al. |
| 2002/0059580 A1 | 5/2002 | Kalker et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0177372 A1 | 8/2005 | Wang et al. |
| 2005/0238238 A1 | 10/2005 | Xu et al. |
| 2005/0245241 A1 | 11/2005 | Durand et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |

(56) References Cited

U.S. PATENT DOCUMENTS

| | | |
|---|---|---|
| 2009/0037408 A1 | 2/2009 | Rodgers |
| 2009/0043637 A1 | 2/2009 | Eder |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0197857 A1 | 8/2012 | Huang et al. |
| 2012/0239694 A1 | 9/2012 | Avner et al. |
| 2012/0299961 A1 | 11/2012 | Ramkumar et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0050260 A1* | 2/2013 | Reitan .................... G06F 3/011 345/633 |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2015/0286742 A1 | 10/2015 | Zhang et al. |
| 2015/0289022 A1 | 10/2015 | Gross |
| 2016/0026707 A1 | 1/2016 | Ong et al. |

FOREIGN PATENT DOCUMENTS

| | | |
|---|---|---|
| WO | 2003067467 A1 | 8/2003 |
| WO | 2004019527 A1 | 3/2004 |
| WO | WO2007049282 | 5/2007 |
| WO | 2014137337 A1 | 9/2014 |
| WO | 2016040376 A1 | 3/2016 |

OTHER PUBLICATIONS

Boari et al, "Adaptive Routing for Dynamic Applications in Massively Parallel Architectures", 1995 IEEE, Spring 1995.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005; Entire Document.

Chuan-Yu Cho, et al., "Efficient Motion-Vector-Based Video Search Using Query by Clip", 2004, IEEE, Taiwan, pp. 1-4.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan, et al. "Content-Based Retrieval of Music and Audio", 1997 Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Gomes et al., "Audio Watermaking and Fingerprinting: For Which Applications?" University of Rene Descartes, Paris, France, 2003.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Guo et al, "AdOn: An Intelligent Overlay Video Advertising System", SIGIR, Boston, Massachusetts, Jul. 19-23, 2009.

Howlett et al., "A Multi-Computer Neural Network Architecture in a Virtual Sensor System Application", International Journal of Knowledge-based Intelligent Engineering Systems, 4 (2). pp. 86-93, 133N 1327-2314.

Ihab Al Kabary, et al., "SportSense: Using Motion Queries to Find Scenes in Sports Videos", Oct. 2013, ACM, Switzerland, pp. 1-3.

International Search Authority: "Written Opinion of the International Searching Authority" (PCT Rule 43bis.1) including International Search Report for International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding ntemational Patent Application No. PCT/IL2006/001235; dated Jul. 28, 2009.

International Search Report for the corresponding International Patent Application PCT/IL2006/001235; dated Nov. 2, 2008.

IPO Examination Report under Section 18(3) for corresponding UK application No: GB1001219.3, dated Sep. 12, 2011.

Iwamoto, K; Kasutani, E.; Yamada, A.: "Image Signature Robust to Caption Superimposition for Video Sequence Identification"; 2006

(56) References Cited

OTHER PUBLICATIONS

IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.
Jianping Fan et al., "Concept-Oriented Indexing of Video Databases: Towards Semantic Sensitive Retrieval and Browsing", IEEE, vol. 13, No. 7, Jul. 2004, pp. 1-19.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Morad, Tn. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Ortiz-Boyer et aL, "CIXL2: A Crossover Operator for Evolutionary Algorithms Based on Population Features", Journal of Artificial Intelligence Research 24 (2005), pp. 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper et al, "Nonlinear dynamics in neural computation", ESANN'2006 proceedings—European Symposium on Artiticial Neural Networks, Bruges (Belgium), Apr. 26-28, 2006, d-side publi, ISBN 2-930307-06-4.
Semizarov et al. "Specificity of Short Interfering RNA Determined through Gene Expression Signatures", PNAS, 2003, pp. 6347-6352.
Shifi-Fu Chang, et al., "VideoQ: A Fully Automated Video Retrieval System Using Motion Sketches", 1998, IEEE, , New York, pp. 1-2.
Theodoropoulos et al, "Simulating Asynchronous Architectures on Transputer Networks", Proceedings of the Fourth Euromicro Workshop on Parallel and Distributed Processing, 1996. PDP '96.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Brecheisen, et al., "Hierarchical Genre Classification for Large Music Collections", ICME 2006, pp. 1385-1388.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Odiaev, et al., "Cliques in Neural Ensembles as Perception Carriers", Technion—Israel Institute of Technology, 2006 International Joint Conference on Neural Networks, Canada, 2006, pp. 285-292.
Santos, et al., "SCORM-MPEG: an Ontology of Interoperable Metadata for Multimedia and e-Learning", 2015 23rd International Conference on Software, Telecommunications and Computer Networks (SoftCOM) Year. 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

(56) References Cited

OTHER PUBLICATIONS

Wang et al. "A Signature for Content-based Image Retrieval Using a Geometrical Transform", ACM 1998, pp. 229-234.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Wei-Te Li et al., "Exploring Visual and Motion Saliency for Automatic Video Object Extraction", IEEE, vol. 22, No. 7, Jul. 2013, pp. 1-11.

Whitby-Strevens, "The Transputer", 1985 IEEE, Bristol, UK.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Yanai, "Generic Image Classification Using Visual Knowledge on the Web," MM'03, Nov. 2-8, 2003, Tokyo, Japan, pp. 167-176.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

\* cited by examiner

SYSTEM AND METHOD FOR GENERATING A CUSTOMIZED AUGMENTED REALITY ENVIRONMENT TO A USER

CROSS-REFERENCE TO RELATED APPLICATIONS

This application claims the benefit of U.S. Provisional Application No. 62/372,372 filed on Aug. 9, 2016. This application is a continuation-in-part (CIP) of U.S. patent application Ser. No. 14/643,694 filed on Mar. 10, 2015, now pending, which is a continuation of U.S. patent application Ser. No. 13/766,463 filed on Feb. 13, 2013, now U.S. Pat. No. 9,031,999. The application Ser. No. 13/766,463 is a continuation-in-part of U.S. patent application Ser. No. 13/602,858 filed on Sep. 4, 2012, now U.S. Pat. No. 8,868,619. The application Ser. No. 13/602,858 is a continuation of U.S. patent application Ser. No. 12/603,123, filed on Oct. 21, 2009, now U.S. Pat. No. 8,266,185, which is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, now pending, which is a CIP of the above-referenced U.S. patent application Ser. Nos. 12/084,150, and 12/195,863; and (4) U.S. patent application Ser. No. 12/538,495 filed on Aug. 10, 2009, now U.S. Pat. No. 8,312,031, which is a CIP of the above-referenced U.S. patent application Ser. Nos. 12/084,150, 12/195,863, and 12/348,888.

All of the applications referenced above are herein incorporated by reference for all that they contain.

TECHNICAL FIELD

The present disclosure relates generally to the analysis of multimedia content, and more specifically to adding multimedia content to augmented reality views based on analysis of the augmented reality views.

BACKGROUND

Digital gaming implemented online and by gaming machines is a popular pastime as well as a significant source of revenue for both private and governmental entities. Digital games (often referred to as "video games") can be more complex than their manual counterparts (e.g., board games, non-digital physical activities, etc.) because a computing device may be utilized to track status and to direct game play. An ongoing need exists for improving user experience while playing digital games by, e.g., providing more visually engaging views of gaming environments, increasing user immersion into the gaming environment, more quickly adapting the game based on user actions, and the like.

Augmented reality (AR) technology typically presents real world information (e.g., an image of a real world environment) augmented by virtual information (e.g., images, text, sounds, etc.). Such real world information may include data from various sensors such as, but not limited to, accelerometers, GPS devices, compasses, gyroscopes, proximity sensors, cameras, and microphones.

Virtual objects are objects within a software application that can be displayed on a display of a computing device. In the context of digital gaming, virtual objects may be utilized to populate the virtual world created by an application. These virtual objects may include, but are not limited to, video game characters, trees, mountains, animals, fireworks, arrows, monsters, sports balls, and other environmental effects.

A common application of AR technology is for displaying real world imagery including live video or still images, and overlaying (i.e., superimposing) virtual objects on the real world imagery. To produce such AR imagery, a camera captures a video or still image of the real world, and a computing device superimposes one or more virtual objects over the captured video or still image.

AR images can be more entertaining when the virtual objects shown in the AR imagery convincingly appear to exist in the real world. However, in many cases, the depiction of interactions between virtual and real world objects in AR imagery is less than realistic. As a result, user engagement with the games or any other content may be decreased by the less than realistic depiction, thereby causing lower levels of user engagement.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for generating a customized augmented reality environment. The method comprises: causing generation of at least one signature for at least one multimedia content; causing, based on the generated at least one signature, identification of at least one matching concept, wherein each concept is a collection of signatures and metadata representing the concept; determining, based on the identified at least one matching concept, a selection of at least one augmented reality character; and generating a customized augmented reality environment, wherein the customized augmented reality environment includes each augmented reality character superimposed on the at least one multimedia content element as an overlay.

Certain embodiments disclosed herein also include a non-transitory computer readable medium having stored thereon instructions for causing one or more processing units to execute a method, the method comprising: causing generation of at least one signature for at least one multimedia content, wherein each signature is generated by a signature generator system including a plurality of computational cores, each computational core having properties that are at least partially statistically independent of properties of the other computational cores; causing, based on the generated at least one signature, identification of at least one matching concept; determining, based on the identified at least one matching concept, a selection of at least one augmented reality character; and generating a customized augmented reality environment, wherein the customized augmented reality environment includes each augmented reality character superimposed on the at least one multimedia content element as an overlay.

Certain embodiments disclosed herein also include a system for generating a customized augmented reality environment. The system comprises: a processing circuitry; and a memory, the memory containing instructions that, when executed by the processing circuitry, configure the system to: cause generation of at least one signature for at least one multimedia content; cause, based on the generated at least one signature, identification of at least one matching concept, wherein each concept is a collection of signatures and metadata representing the concept; determine, based on the identified at least one matching concept, a selection of at least one augmented reality character; and generate a customized augmented reality environment, wherein the customized augmented reality environment includes each augmented reality character superimposed on the at least one multimedia content element as an overlay.

Certain embodiments disclosed herein also include a method for generating a customized augmented reality environment. The method comprises: causing generation of at least one signature for at least one multimedia content; determining, based on the generated at least one signature, a selection of at least one augmented reality character, wherein each augmented reality character is associated with a character signature; identifying at least one potential placement location in the at least one multimedia content element, wherein each potential placement location is associated with at least a portion of the generated at least one signature; correlating between the at least one potential placement location signature portion and the at least one character signature to select, for each augmented reality character, a placement location in the at least one multimedia content element; and generating a customized augmented reality environment, wherein the customized augmented reality environment includes each augmented reality character superimposed on the at least one multimedia content element at the respective placement location.

Certain embodiments disclosed herein also include a system for generating a customized augmented reality environment, comprising: a processing circuitry; and a memory, the memory containing instructions that, when executed by the processing circuitry, configure the system to: cause generation of at least one signature for at least one multimedia content; determine, based on the generated at least one signature, a selection of at least one augmented reality character, wherein each augmented reality character is associated with a character signature; identify at least one potential placement location in the at least one multimedia content element, wherein each potential placement location is associated with at least a portion of the generated at least one signature; correlate between the at least one potential placement location signature portion and the at least one character signature to select, for each augmented reality character, a placement location in the at least one multimedia content element; and generate a customized augmented reality environment, wherein the customized augmented reality environment includes each augmented reality character superimposed on the at least one multimedia content element at the respective placement location.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
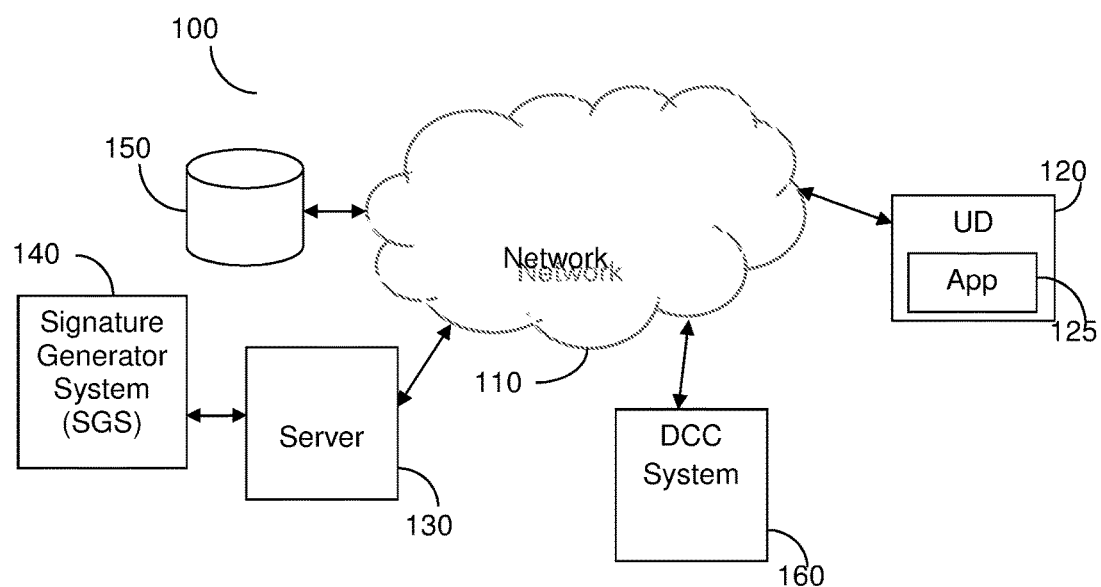
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The example disclosed embodiments include a method and system for generating a customized augmented reality environment. At least one multimedia content element is identified. At least one concept of the multimedia content elements is identified. Each concept is a collection of signatures and metadata representing the concept. At least one augmented reality character is selected, where each character has a set of characteristics associated therewith. A customized augmented reality environment including the at least one augmented reality character superimposed on the at least one multimedia content element is generated.

FIG. 1 shows an example network diagram 100 utilized to describe the various disclosed embodiments. A network 110 is used to communicate between different parts of the system 100. The network 110 may be the Internet, the world-wide-web (WWW), a local area network (LAN), a wide area network (WAN), a metro area network (MAN), and other networks capable of enabling communication between the elements of the system 100.

Further connected to the network 110 is a user device (UD) 120, a server 130, a signature generator system (SGS) 140, a database 150, and a deep content classification (DCC) system 160. The user device 120 may be, but is not limited to, a personal computer (PC), a personal digital assistant (PDA), a mobile phone, a smart phone, a tablet computer, an electronic wearable device (e.g., glasses, a watch, etc.), or any other kinds of wired or mobile appliance, equipped with browsing, viewing, capturing, storing, listening, filtering, and managing capabilities enabled as further discussed herein below.

The user device 120 may further have a software application (App) 125 installed thereon. The application 125 may be downloaded from an application repository such as, e.g., AppStore®, Google Play®, or any other repository hosting software applications. The application 125 may be pre-installed in the user device 120. The application 125 may be a web browser. It should be noted that the embodiments described herein with respect to FIG. 1 are discussed with respect to one user device 120 and one application 125 merely for simplicity purposes and without limitation on the disclosed embodiments. The embodiments disclosed herein are equally applicable to multiple user devices, and each user device may be installed with one or more applications.

Also communicatively connected to the network 110 is the database 150. The database 150 may store information utilized for generating augmented reality views such as, but not limited to, multimedia content elements, characteristics associated with augmented reality characters, combinations thereof, and the like. As shown in FIG. 1, the server 130 may communicate with the database 150 through the network 110. In other non-limiting embodiments, the server 130 is directly connected to the database 150.

The server 130 is configured to communicate with the SGS 140 and the DCC system 160 to perform the various disclosed embodiments. The SGS 140 and the DCC 160 may be connected to the server 130 directly, or may communicate with the server 130 over the network 110. In some configurations, the SGS 140, the DCC system 160, or both, may be integrated within the server 130.

The server 130 typically includes a processing circuitry 132 coupled to a memory 134. The memory 134 contains instructions that can be executed by the processing circuitry 132. The instructions, when executed by the processing circuitry 132, configure the server 130 to perform the various disclosed methods. The server 130 also typically includes a network interface (not shown) utilized for communicating with the network 110.

The processing circuitry 132 may comprise or be a component of a processor (not shown) or an array of processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

In another embodiment, the processing circuitry 132 can be realized an array of computational cores having properties that are at least partly statistically independent from other cores of the plurality of computational cores. The array of computational cores configured as described further herein below.

The server 130 is configured to receive and utilize multimedia content elements. To this end, the server 130 may be configured to, but not limited to, identify metadata associated with the multimedia content element, save the received multimedia content elements and associated metadata in the database 150 or in the user device 120, generate a customized augmented reality environment based on the multimedia content elements, and more. A multimedia content may be or may include, but is not limited to, an image, a graphic, a video stream, a video clip, an audio stream, an audio clip, a video frame, a photograph, and an image of signals (e.g., spectrograms, phasograms, scalograms, etc.), a combination thereof, and a portion thereof.

In an embodiment, the server 130 is configured to identify at least one multimedia content element. The identified at least one multimedia content element may be included in a request to generate a customized augmented reality environment. The server 130 is configured to send each identified multimedia content element to the SGS 140, the DCC system 160, or both. To which system(s) the multimedia content elements should be sent may be predetermined, or may be determined based on the results by returned by each system. For example, if the DCC 160 returns a concept based on the identified multimedia content element, there is no need to generate a signature for the element.

Each identified multimedia content element is typically an image or video illustrating an area in the real world. It should be noted, however, that other types of multimedia contents, both now known and hereinafter developed, may be utilized for generating the customized augmented reality environment. Further, although the identified multimedia content elements may show the real world, the embodiments disclosed herein are not limited as such and may include superimposing characters on multimedia content representing, e.g., virtual reality or any otherwise artificial (i.e., not necessarily part of the real physical world) areas may be equally utilized without departing from the scope of the disclosure. For example, images from a virtual reality program may be analyzed and further enhanced by generating customized augmented reality environments based on the virtual reality images.

In an embodiment, the SGS 140 is configured to receive a multimedia content element and to generate at least one signature for each of the received at least one multimedia content element. The at least one signature can be generated using a plurality of computational cores, where each core of the plurality of computational cores is at least partially statistically independent of the other computational cores. In a further embodiment, each generated signature is robust to noise and distortion. The generation of signatures for multimedia content elements is described further herein below.

In another embodiment, the signature for each received multimedia content element may representative of at least one concept structure (hereinafter referred to as a "concept"). A concept is a collection of signatures representing elements of the unstructured data and metadata describing the concept. As a non-limiting example, a 'Superman concept' is a signature-reduced cluster of signatures describing elements (such as multimedia elements) related to, e.g., a Superman cartoon: a set of metadata representing proving textual representation of the Superman concept. Techniques for generating concept structures (or "concepts") are also described in the above-referenced U.S. Pat. No. 8,266,185

(hereinafter '185) to Raichelgauz, et al., which is assigned to common assignee, and is incorporated hereby by reference for all that it contains.

According to this embodiment, the server 130 is configured to send, to the DCC system 160, a query for matching the multimedia content element to at least one concept structure. If a match is found, the metadata of the matching concept may be utilized to analyze the multimedia content element. The matching may include, but is not limited to, matching at least one signature generated for the multimedia content element to a plurality of concept signatures, where each concept signature represents a concept. The signatures generated for the multimedia content element may be generated by, e.g., the SGS 140, the DCC system 160, and the like. The matching may be performed for all concepts maintained by the DCC system 160.

It should be noted that if multiple concepts are determined to match a multimedia content element, the server 130 may be configured to correlate among the matching concepts to generate a tag or other metadata that best describes the multimedia content element. The correlation may further be based on, but not limited to, a ratio between signatures' respective sizes, a spatial location of each signature, one or more probabilistic models, and the like.

Based on the analysis of the multimedia content element, objects in the multimedia content element represented by concepts may be identified. As a non-limiting example, based on an analysis of an image taken in London, England, the location of London is identified as well as various objects shown in the image such as, e.g., people, restaurants, chairs, tables, benches, trees, and the like.

In an embodiment, the server 130 is configured to receive a selection of at least one augmented reality character to be included in the customized augmented reality environment. In a further embodiment, the selection may be received from the user device 120. In another embodiment, the server 130 may be configured to select at least one augmented reality character from among a plurality of augmented reality characters (e.g., augmented reality characters stored in the database 150) based on, e.g., one or more selection rules. The selection rules may be based on in-game performance or otherwise based on personal or environmental variables currently related to the user of the user device 120. For example, the selected at least one augmented reality character may be determined based on, but not limited to, a current progress (e.g., level) of the user in a game, any in-game or otherwise promotional events, a location of the user, a time of day, a day of the week, a season, combinations thereof, and the like.

Each augmented reality character has a set of characteristics associated therewith. The characteristics may, e.g., define the augmented reality character within the context of an augmented reality program executed on the user device 120. In particular, the characteristics may include concepts utilized for determining selection, placement, or both of the augmented reality character such as, but not limited to, locations in which the character may be selected as well as objects on which the augmented reality character may be superimposed. As an example, for an augmented reality character sitting and holding a cup of coffee, the sitting character's characteristics may indicate that the character is to be superimposed on objects such as chairs and benches and selected when the multimedia content element includes a location such as a coffee shop or restaurant.

In a further embodiment, the characteristics may include contextually related concepts. To this end, the at least one selected augmented reality character may be determined based on identification of concepts in the multimedia content element matching the contextually related concepts. For example, for a monster-catching augmented reality game, if the at least one multimedia content element includes grass, a grass-related monster may be selected. If the at least one multimedia content element includes an ocean, a water-related monster may be selected.

The characteristics may further include in-game features of the augmented reality character for augmented reality games. As a non-limiting example for in-game characteristics, the selected augmented reality character may be a Superman character having characteristics including the ability to fly in-game. Alternatively, the augmented reality character may have characteristics similar to those of a user of the user device 120 as defined by, e.g., that user.

Based on the at least one multimedia content element and the at least one selected augmented reality character, the server 130 is configured to generate a customized augmented reality environment. The customized augmented reality environment includes the at least one selected augmented reality character superimposed on the at least one multimedia content element.

In a further embodiment, the server 130 is configured to generate an AR-interface allowing the user of the user device 120 to interact with the customized augmented reality environment with respect to the at least one selected augmented reality character. Inputs received via the AR-interface may be utilized for, but not limited to, controlling each augmented reality character. The controlling of each character may be further based on each character's associated set of characteristics. In an embodiment, the AR-interface in is an application programming interface identifies as set of user inputs (such as, but not limited to, user gestures) allowing to control the character. Such an API may include a set of common functions for each character and a set of different functions that are different from character to another.

As a non-limiting example, an image of Times Square in Manhattan, N.Y., is captured or received by the user device 120. The server 130 is configured to generate a signature based on the Times Square image. The signature is matched to a plurality of concepts. Based on the matching, concepts of Times Square and various people and benches are identified. A selection of a crawling Spider-Man character is further received from the user device 120. The crawling Spider-Man character is associated with characteristics indicating that the crawling Spider-Man character is to be selected for New York City locations and is to be superimposed on buildings. The server 130 generates a customized augmented reality environment including the crawling Spider-Man character superimposed on the image of Times Square. Specifically, the crawling Spider-Man character may be superimposed on a building shown in the image such that the crawling Spider-Man character appears to be climbing the building.

It should be noted that the signatures generated for the multimedia content elements enables accurate analysis of the elements, because the signatures generated according to the disclosed embodiments allow for recognition and classification of multimedia content.

It should also be noted that the SGS 140 is shown in FIG. 1 as a separate device from the server 130 and from the user device 120 merely for simplicity purposes and without limitation on the disclosed embodiments. The SGS 140 may be included in the server 130 or the user device 120 without departing from the scope of the disclosure. Inclusion of a signature generator in a user device is described further herein below with respect to FIG. 6.

Figure 2:
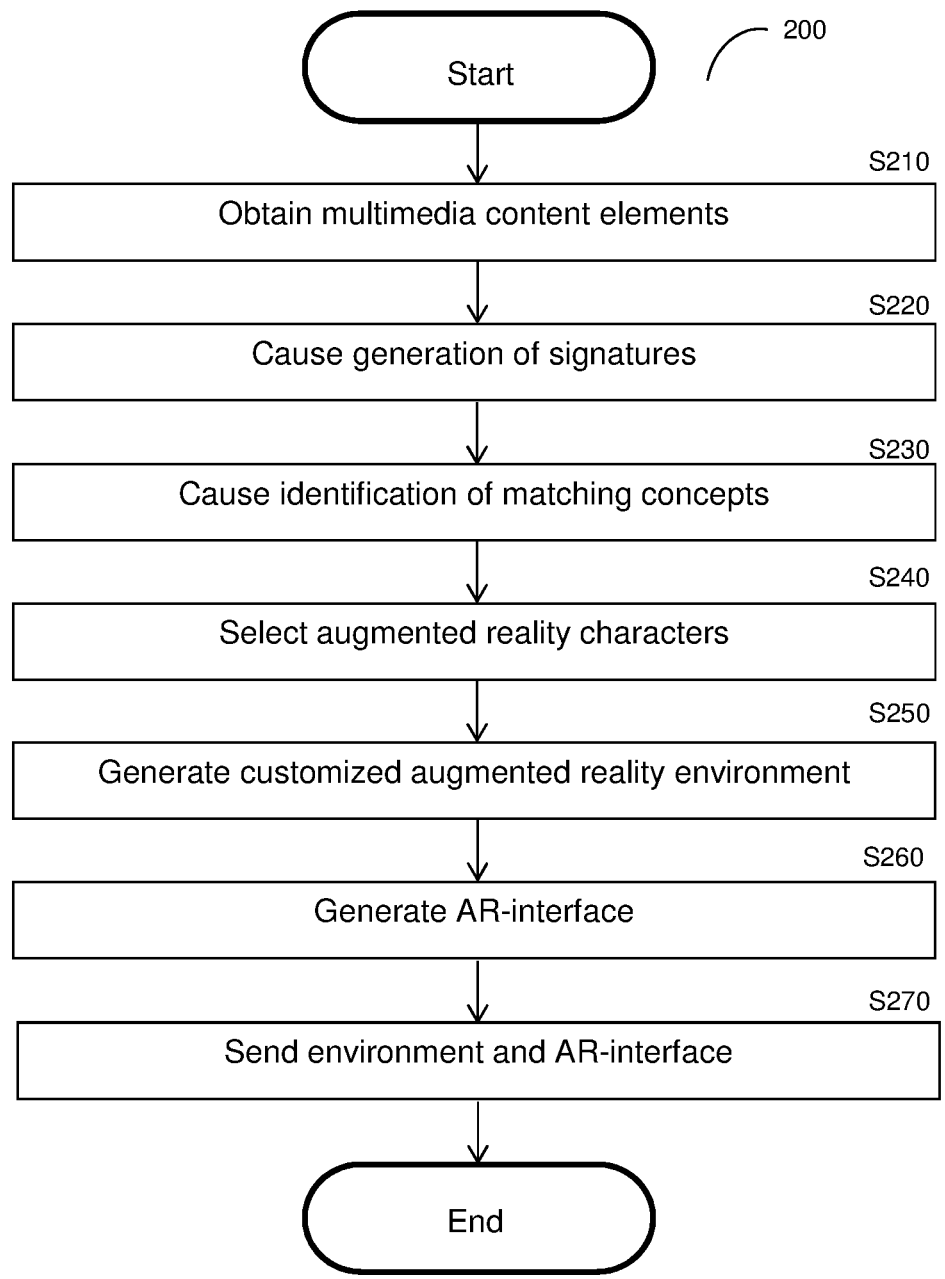
FIG. 2 is a flowchart illustrating a method for providing a customized augmented reality environment to a user based on signatures for multimedia content according to an embodiment.

FIG. 2 is an example flowchart 200 illustrating a method for providing a customized augmented reality environment according to an embodiment. In an embodiment, the method may be performed by a server (e.g., the server 130) communicatively connected to a user device (e.g., a user device 120). In a further embodiment, the server may be communicatively connected to or may include a signature generator system (e.g., the SGS 140) and a deep-content classification system (e.g., the DCC system 160). In another embodiment, the method may be performed in part by a user device (e.g., the user device 120).

At S210, at least one multimedia content element showing a portion of the real world is received. The at least one multimedia content element may be, e.g., captured by a user device. The identified at least one multimedia content element may be received from the user device.

At S220, generation of at least one signature is caused for each received multimedia content element. Each signature is generated by a signature generator system (e.g., the SGS 140) as described further herein below with respect to FIGS. 3 and 4. To this end, in an embodiment, S220 may further include sending the at least one multimedia content element to the signature generator system.

At S230, identification of at least one matching concept is caused for each received multimedia content element. In an embodiment, S230 may include querying a DCC system (e.g., the DCC system 160) using the generated signature(s) for each multimedia content element. Each concept is a collection of signatures and associated metadata. In an embodiment, a concept matches a signature of a multimedia content element if a signature representing the concept matches the signature of the multimedia content element above a predetermined threshold. In an embodiment, the DCC system can be queried using the received at least one multimedia content element to identify at least one matching concept.

In an alternative embodiment, the generated signatures are compared to a set of concepts stored in a memory (e.g., a local memory of the phone) to identified a matching concept.

At S240, based on the identified matching concept(s), at least one augmented reality character is selected. Each augmented reality character has a set of characteristics. The set of characteristics define the augmented reality character with respect to an augmented reality program and may include, but are not limited to, contextually related concepts, concepts of objects that the character may be superimposed on, in-game parameters, and the like. To this end, S240 may further include determining whether the at least one matching concept is contextually related to one or more contextually related concepts of the characteristics.

At S250, a customized augmented reality environment is generated based on the selected at least one augmented reality character and the identified at least one multimedia content element. The customized augmented reality environment includes each of the at least one augmented reality character superimposed over an object shown in the at least one multimedia content element. In a further embodiment, S250 may also include determining, based on the set of characteristics of each selected augmented reality character, a placement of the selected character within the multimedia content element with respect to the identified concepts. For example, an augmented reality character that is a fish may be placed in an object that is associated with the concept "water." Generating customized augmented reality environments is described further herein below with respect to FIG. 5.

At S260, an AR-interface is generated with respect to the selected at least one character and the identified at least one multimedia content element. The AR-interface enables interaction with the customized augmented reality environment.

At S270, a display of the customized augmented reality environment and the AR-interface is caused over the user device.

As a non-limiting example, a series of images showing the area surrounding a lake is received. The series of images is to be utilized for an augmented reality monster catching game. Robust signatures for the images are caused to be generated by a signature generator system. A DCC system is queried using the generated robust signatures. The DCC system identifies concepts matching the signatures including the lake, large rocks near the lake, and a car parked by the lake.

Based on the concepts of the lake and the rocks, augmented reality characters including a fish monster and a rock monster are selected. Specifically, the fish monster has characteristics including contextually related concepts of lakes and other bodies of water, and the rock monster has characteristics including contextually related concepts of rocks and sand.

A customized augmented reality environment including the fish monster superimposed on part of the lake and the rock monster superimposed on one of the large rocks is generated. An AR-interface for interacting with the customized augmented reality and, in particular, the fish monster and the rock monster, is generated and sent to a user device along with the customized augmented reality environment. User interactions with the AR-interface may be utilized for, e.g., determining in-game events.

Figure 3:
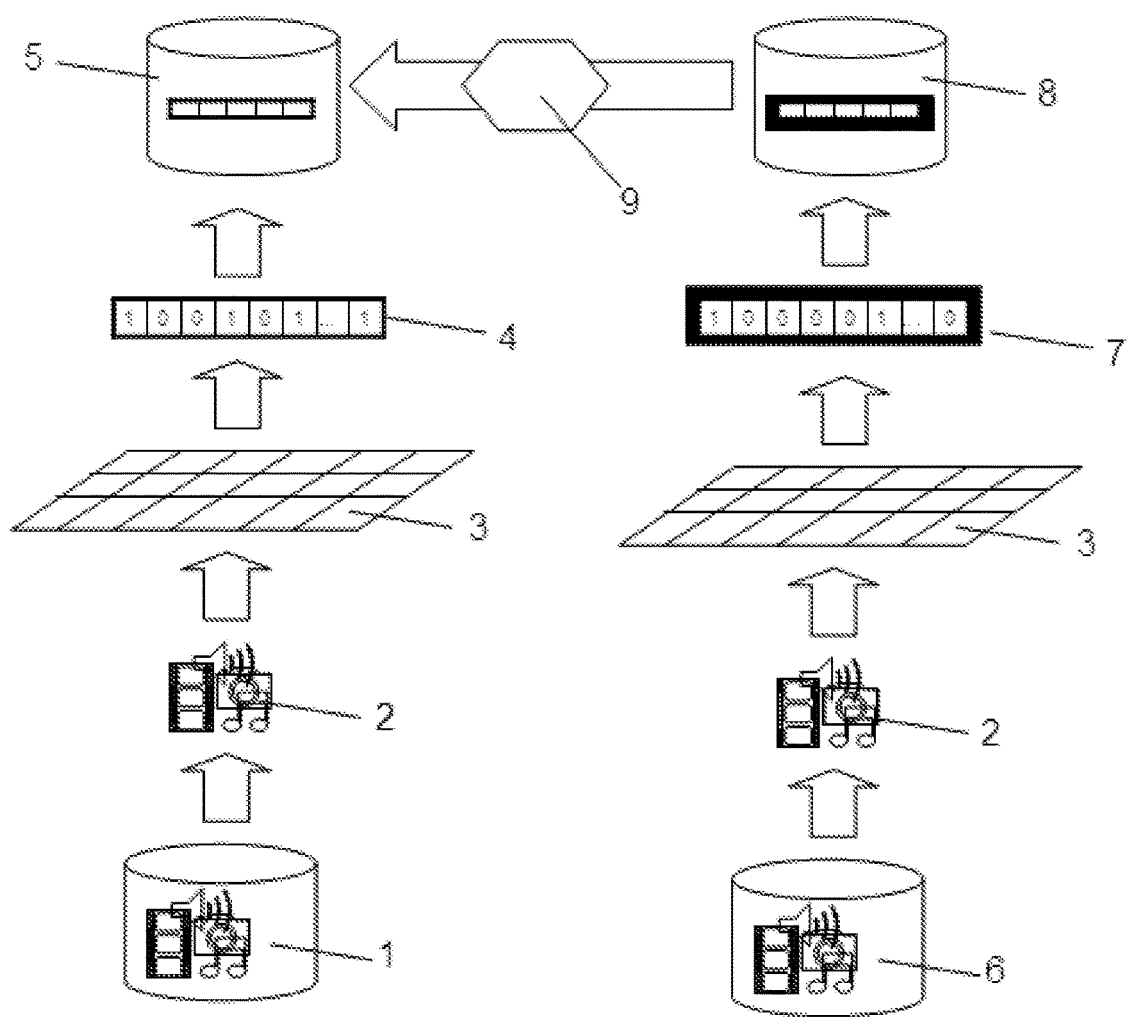
FIG. 3 is a block diagram depicting the basic flow of information in the signature generator system.
Figure 4:
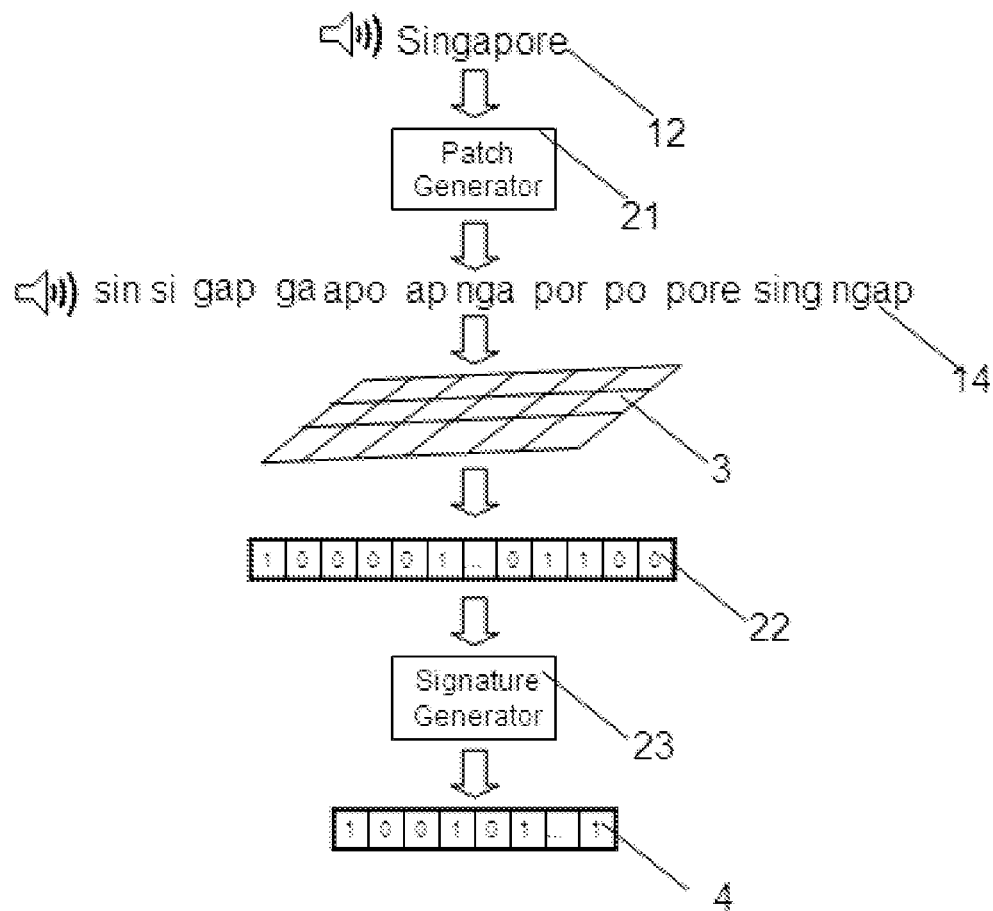
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 3. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment the server 130 is configured with a plurality of computational cores to perform matching between signatures.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, θ is a Heaviside step function; $w_{ij}$ is a coupling node unit (CNU) between node i and image component j (for example, grayscale value of a certain pixel j); kj is an image component 'j' (for example, grayscale value of a certain pixel j); Thx is a constant Threshold value, where 'x' is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria.

1: For: $V_i > Th_{RS}$ $1-p(V>Th_S)-1-(1-\varepsilon)^l \ll 1$ i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

In order to generate signatures robust to additive noises, such as White-Gaussian-Noise, scratch, etc., and robust to distortions, such as crop, shift and rotation, etc., the core $C_i$ should consist of a group of nodes (LTUs): $C_i=\{n_{im}\}$, where m is the number of nodes in each core I, generated according to certain statistical processes, modeling variants of certain set of distortions.

The first step in generation of distortions-invariant signatures is to generate m Signatures and Robust Signatures, based on each of the m nodes in all the L cores, according to the previously described (above) algorithm. The next step is to determine a subset V of m potential signatures-variants for certain frame i. This is done by defining a certain consistent and robust selection criterion, for example, select top f signature-variants out of m, with highest firing-rate across all L computational cores. The reduced set will be used as Signature and Robust Signature, invariant to distortions which were defined and used in the process of computational cores generation.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above-mentioned U.S. Pat. No. 8,655,801.

Figure 5:
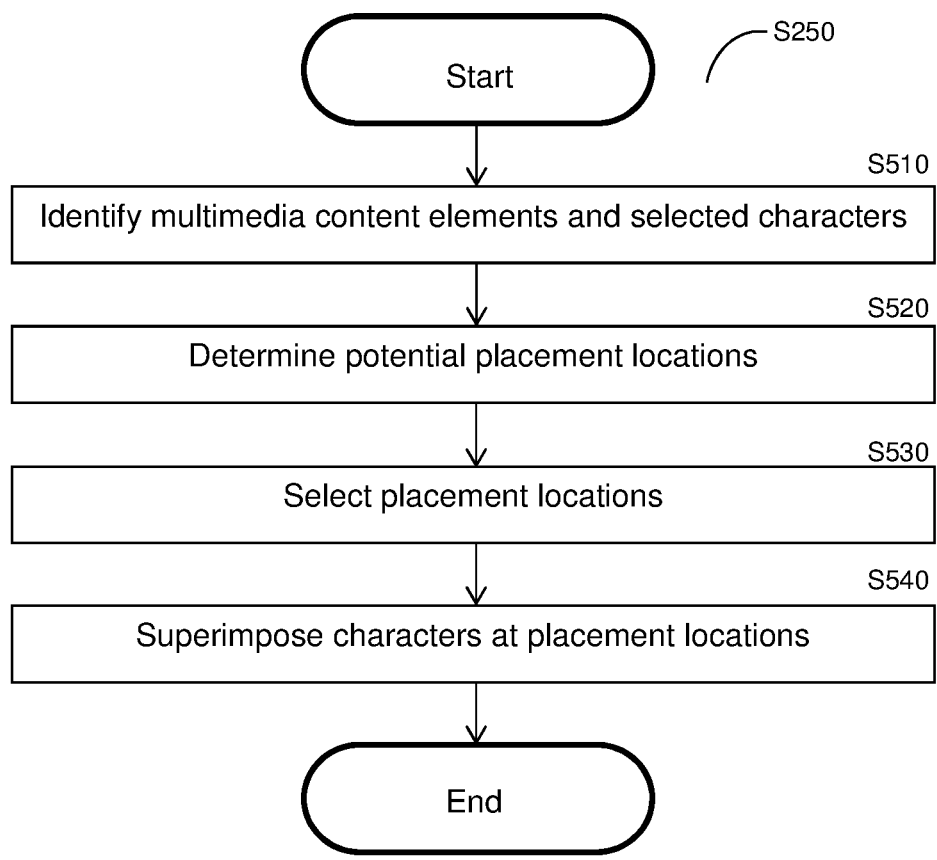
FIG. 5 is a flowchart illustrating a method for generating a customized augmented reality environment according to an embodiment.

FIG. 5 is an example flowchart S250 illustrating a method for generating an augmented reality environment according to an embodiment.

At S510, at least one multimedia content element and at least one selected augmented reality character are obtained. The at least one multimedia content element includes a plurality of objects shown therein such as, but not limited to, people, animals, rocks, bodies of water, plants, manmade structures (e.g., buildings and statues), benches, chairs, stages, and the like. It should be noted that this list of objects is merely an example of various objects that may be shown in an image, and is not limiting on any of the disclosed embodiments.

At S520, at least one potential placement location within each multimedia content element is determined for each augmented reality character. Each potential placement location may be, but is not limited to, the position of one of the objects shown in the image. The potential placement locations may be determined based on, but not limited to, the characteristics of each augmented reality character. For example, if the characteristics of the augmented reality character indicates that the augmented reality character may be placed on signs (e.g., traffic signs, billboards, etc.), potential placement locations may include being superimposed on signs shown in the at least one multimedia content element.

At S530, a placement location may be selected for each augmented reality character from among the at least one potential placement location for the character. In an embodiment, S530, includes correlating signatures of each augmented reality character with the signature of each potential placement location to determine whether the potential placement location should be selected for a particular augmented reality character. The correlation may be further performed with respect to, but not limited to, the size of the augmented reality character as compared to the size of the object in the potential placement location, the shape of the augmented reality character as compared to a shape of the object in the potential placement location, a combination thereof, and the like.

At S540, each augmented reality character is superimposed on the at least one multimedia content element based on the selected placement locations. In an embodiment, if no placement location is selected for a particular augmented reality character (i.e., if no placement location has a suitable size or shape), the character may not be superimposed on the at least one multimedia content element. The customized augmented reality environment includes the at least one multimedia content element having the at least one augmented reality character superimposed thereon.

As a non-limiting example, an image of a sports stadium including several seats as well as several sports fan augmented reality characters are identified. Some seats are identified as potential placement locations for sports fan characters whose characteristics indicate that they are sitting, and the areas in front of other seats are determined as potential placement locations for sports fan characters whose characteristics indicate that they are standing. A signature for each sports fan character is correlated with the signature of its respective seat to determine whether to select the potential placement location for the character based on the size and shape of the character relative to the size and shape of the respective seat or area in front of a seat. Each sports fan character having a signature that is sufficiently correlated to that of the corresponding seat or area in front of the seat is superimposed on that seat or area.

Figure 6:
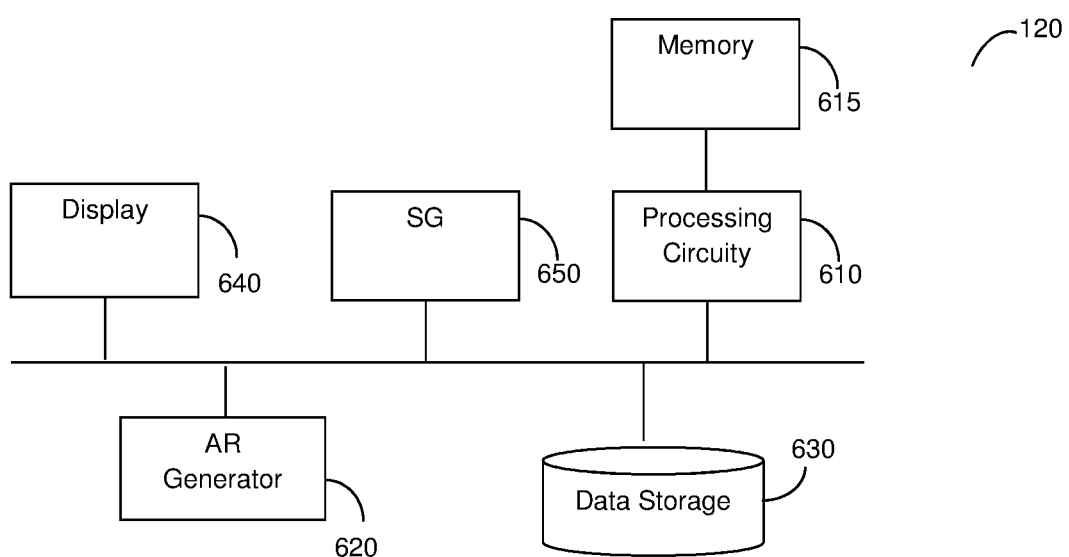
FIG. 6 is an example block diagram of a user device configured to generate and display a customized augmented reality environment according to an embodiment.

FIG. 6 depicts an example block diagram of a user device 120 configured to generate and display a customized augmented reality environment according to an embodiment. The user device 120 includes a processing circuitry 610 coupled to a memory 615. The memory contains instructions that, when executed by the processing circuitry 610, configures the user device 120 to generate and display the augment reality environment and operations of other applications (e.g., the app 125, FIG. 1) installed in the user device 120. The user device 120 may further include an augmented reality (AR) generator 620, a local storage 630, a display 640, and a signature generator (SG) 650.

The signature generator 650 may be configured to generate signatures for multimedia content elements. In a further embodiment, the signature generator 610 includes a plurality of computational cores as discussed further herein above, where each computational core is at least partially statistically independent of the other computational cores.

The data storage 630 may store a plurality of multimedia content elements, a plurality of concepts, signatures for the multimedia content elements, signatures for the concepts, or a combination thereof. In a further embodiment, the data storage 630 may include a limited set of concepts relative to a larger set of known concepts. Such a limited set of concepts may be utilized when, for example, the data storage 630 is included in a device having a relatively low storage capacity such as, e.g., a smartphone or other mobile device, or otherwise when lower memory use is desirable.

The AR generator 620 is configured to receive or otherwise retrieve a multimedia content element from the local storage. The AR generator 620 is further configured to initialize the signatures generator (SG) 650 to generate at least one signature for the received the multimedia content element. The AR generator 620 is configured to match the generated signatures against the concepts stored in the storage 630. Matching concepts are utilized to generate the customized augmented reality environment as discussed in greater detail above with respect to FIG. 1. Once generated, the customized augmented reality environment is displayed over the display 640.

The AR generator 620 and the processing circuitry 610 can be implemented as a component of a processor (not shown) or an array of processors, examples of which are provided above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a step in a method is described as including "at least one of A, B, and C," the step can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a customized augmented reality environment, comprising:
    causing generation of at least one signature for at least one multimedia content;
    causing, based on the generated at least one signature, identification of at least one matching concept, wherein each concept is a collection of signatures and metadata representing the concept;
    determining, based on the identified at least one matching concept, a selection of at least one augmented reality character; wherein each one of the at least one augmented reality character is associated with a character signature;
    identifying at least one potential placement location in the at least one multimedia content element, wherein each potential placement location is associated with at least a portion of the generated at least one signature;
    correlating between the at least one potential placement location signature portion and the at least one character signature to select, for each augmented reality character, a placement location in the at least one multimedia content element;
    and
    generating a customized augmented reality environment, wherein the customized augmented reality environment includes each augmented reality character superimposed, at a selected placement location related to the augmented reality character, on the at least one multimedia content element as an overlay.

2. The method of claim 1, wherein each signature is generated by a signature generator system including a plurality of computational cores, each computational core having properties that are at least partially statistically independent of properties of the other computational cores.

3. The method of claim 1, wherein a concept matches the generated at least one signature when a representative signature of the concept matches one of the generated at least one signature above a predetermined threshold.

4. The method of claim 3, wherein the at least one matching concept is identified by matching the generated at least one signature to a plurality of signatures representing concepts.

5. The method of claim 4, wherein causing identification of the at least one matching concept further comprises:
    querying a deep-content classification system using the generated at least one signature, wherein the deep-content classification system matches the generated at least one signature to a plurality of concepts to identify the at least one matching concept.

6. The method of claim 1, wherein determining the selection of the at least one augmented reality character further comprises:
    comparing the at least one matching concept to characteristics of a plurality of potential augmented reality characters, wherein the characteristics of each potential augmented reality character includes contextually related concepts.

7. The method of claim 1, wherein determining the selection of the at least one augmented reality character is based on an in-game performance related to a game associated with the customized augmented reality environment.

8. A non-transitory computer readable medium having stored thereon instructions for causing one or more processing units to execute a method, the method comprising:
    causing generation of at least one signature for at least one multimedia content, wherein each signature is generated by a signature generator system including a plurality of computational cores, each computational core having properties that are at least partially statistically independent of properties of the other computational cores;
    causing, based on the generated at least one signature, identification of at least one matching concept;
    determining, based on the identified at least one matching concept, a selection of at least one augmented reality character; wherein each one of the at least one augmented reality character is associated with a character signature;
    identifying at least one potential placement location in the at least one multimedia content element, wherein each potential placement location is associated with at least a portion of the generated at least one signature;
    correlating between the at least one potential placement location signature portion and the at least one character signature to select, for each augmented reality character, a placement location in the at least one multimedia content element;
    and
    generating a customized augmented reality environment, wherein the customized augmented reality environment includes each augmented reality character superimposed, at a selected placement location related to the augmented reality character, on the at least one multimedia content element as an overlay.

9. A system for generating a customized augmented reality environment, comprising:
    a processing circuitry; and
    a memory, the memory containing instructions that, when executed by the processing circuitry, configure the system to:
        cause generation of at least one signature for at least one multimedia content;
        cause, based on the generated at least one signature, identification of at least one matching concept, wherein each concept is a collection of signatures and metadata representing the concept;
        determine, based on the identified at least one matching concept, a selection of at least one augmented reality character; wherein each one of the at least one augmented reality character is associated with a character signature;
        identify at least one potential placement location in the at least one multimedia content element, wherein each potential placement location is associated with at least a portion of the generated at least one signature;
        correlate between the at least one potential placement location signature portion and the at least one character signature to select, for each augmented reality character, a placement location in the at least one multimedia content element;
        and
        generate a customized augmented reality environment, wherein the customized augmented reality environment includes each augmented reality character superimposed, at a selected placement location related to the augmented reality character, on the at least one multimedia content element as an overlay.

10. The system of claim 9, wherein each signature is generated by a signature generator system including a plurality of computational cores, each computational core having properties that are at least partially statistically independent of properties of the other computational cores.

11. The system of claim 10, wherein a concept matches the generated at least one signature when a representative signature of the concept matches one of the generated at least one signature above a predetermined threshold.

12. The system of claim 11, wherein the system is further configured to:
query a deep-content classification system using the generated at least one signature, wherein the deep-content classification system matches the generated at least one signature to a plurality of concepts to identify the at least one matching concept.

13. The system of claim 9, wherein the system is further configured to:
compare the at least one matching concept to characteristics of a plurality of potential augmented reality characters, wherein the characteristics of each potential augmented reality character includes contextually related concepts.

14. The system of claim 9, wherein a determining of the selection of the at least one augmented reality character is based on an in-game performance related to a game associated with the customized augmented reality environment.

15. A method for generating a customized augmented reality environment, comprising:
causing generation of at least one signature for at least one multimedia content;
determining, based on the generated at least one signature, a selection of at least one augmented reality character, wherein each augmented reality character is associated with a character signature;
identifying at least one potential placement location in the at least one multimedia content element, wherein each potential placement location is associated with at least a portion of the generated at least one signature;
correlating between the at least one potential placement location signature portion and the at least one character signature to select, for each augmented reality character, a placement location in the at least one multimedia content element; and
generating a customized augmented reality environment, wherein the customized augmented reality environment includes each augmented reality character superimposed on the at least one multimedia content element at the respective placement location.

16. The method of claim 15, further comprising:
causing, based on the generated at least one signature, identification of at least one matching concept, wherein the at least one augmented reality character is determined further based on the identified at least one matching concept.

17. The method of claim 16, wherein each concept is a collection of signatures and metadata representing the concept.

18. The method of claim 17, wherein a concept matches the generated at least one signature when a representative signature of the concept matches one of the generated at least one signature above a predetermined threshold.

19. The method of claim 16, wherein determining the selection of the at least one augmented reality character further comprises:
comparing the at least one matching concept to characteristics of a plurality of potential augmented reality characters, wherein the characteristics of each potential augmented reality character includes contextually related concepts.

20. The method of claim 15, wherein the selection of each placement location is further based on a size of the respective augmented reality character.

21. The method of claim 15, wherein each signature is generated by a signature generator system including a plurality of computational cores, each computational core having properties that are at least partially statistically independent of properties of the other computational cores.

22. A system for generating a customized augmented reality environment, comprising:
a processing circuitry; and
a memory, the memory containing instructions that, when executed by the processing circuitry, configure the system to:
cause generation of at least one signature for at least one multimedia content;
determine, based on the generated at least one signature, a selection of at least one augmented reality character, wherein each augmented reality character is associated with a character signature;
identify at least one potential placement location in the at least one multimedia content element, wherein each potential placement location is associated with at least a portion of the generated at least one signature;
correlate between the at least one potential placement location signature portion and the at least one character signature to select, for each augmented reality character, a placement location in the at least one multimedia content element; and
generate a customized augmented reality environment, wherein the customized augmented reality environment includes each augmented reality character superimposed on the at least one multimedia content element at the respective placement location.

23. The system of claim 22, wherein the system is further configured to:
cause, based on the generated at least one signature, identification of at least one matching concept, wherein the at least one augmented reality character is determined further based on the identified at least one matching concept.

24. The system of claim 23, wherein each concept is a collection of signatures and metadata representing the concept.

25. The system of claim 24, wherein a concept matches the generated at least one signature when a representative signature of the concept matches one of the generated at least one signature above a predetermined threshold.

26. The system of claim 22, wherein the system is further configured to:
compare the at least one matching concept to characteristics of a plurality of potential augmented reality characters, wherein the characteristics of each potential augmented reality character includes contextually related concepts.

27. The system of claim 22, wherein the selection of each placement location is further based on a size of the respective augmented reality character.

28. The system of claim 22, wherein each signature is generated by a signature generator system including a plurality of computational cores, each computational core having properties that are at least partially statistically independent of properties of the other computational cores.

* * * * *